United States Patent
Levsen

(10) Patent No.: US 10,034,482 B1
(45) Date of Patent: Jul. 31, 2018

(54) TRIPES CLEANING MACHINE WITH INTEGRATED CLEANING FLUID NOZZLE AND VALVE HANDLE

(71) Applicant: Hantover, Inc., Overland Park, KS (US)

(72) Inventor: Clark A. Levsen, Shawnee, KS (US)

(73) Assignee: Hantover, Inc., Overland Park, KS (US)

( * ) Notice: Subject to any disclaimer, the term of this patent is extended or adjusted under 35 U.S.C. 154(b) by 0 days.

(21) Appl. No.: 15/786,422

(22) Filed: Oct. 17, 2017

(51) Int. Cl.
*A22C 17/16* (2006.01)
*A22B 5/18* (2006.01)

(52) U.S. Cl.
CPC .............. *A22B 5/18* (2013.01); *A22C 17/16* (2013.01)

(58) Field of Classification Search
CPC ............ A22B 5/00; A22B 5/0005; A22B 5/18
USPC .................................................. 452/123, 173
See application file for complete search history.

(56) References Cited

U.S. PATENT DOCUMENTS

| 6,315,654 | B1 * | 11/2001 | Levsen | A22C 17/16 452/123 |
| 6,468,145 | B1 * | 10/2002 | Houtz | A22C 17/16 452/123 |
| 7,261,628 | B2 * | 8/2007 | Levsen | A22B 5/18 452/123 |

* cited by examiner

*Primary Examiner* — Richard T Price, Jr.
(74) *Attorney, Agent, or Firm* — Hovey Williams LLP

(57) ABSTRACT

A tripes cleaning apparatus includes a rotatable drum presenting a tripes-supporting surface and an integrated fluid valve and nozzle assembly operable to selectively discharge fluid from a source into the tripes as the drum is rotated. The assembly includes a valve base fixed relative to the tripes-supporting surface and a valve body rotatable relative to the valve base into and out of a closed position. Fluid flow to the tripes is at least substantially prevented when the valve body is in the closed position. The assembly also includes a nozzle rigidly fixed to the valve body. The nozzle is elongated to present a fluid discharge opening spaced from the valve body, with swinging of the nozzle controlling rotation of the valve body into and out of the closed position.

20 Claims, 13 Drawing Sheets

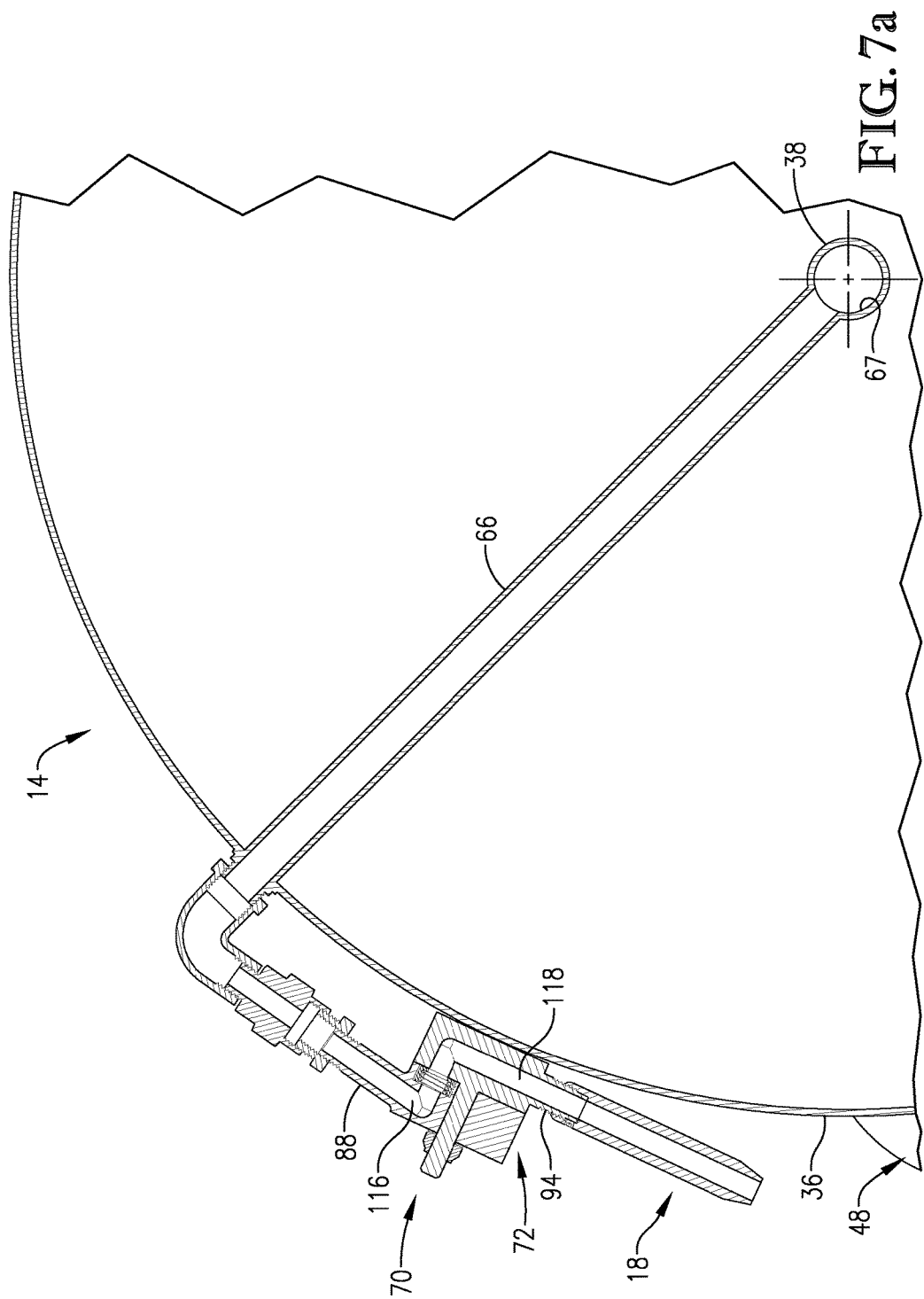

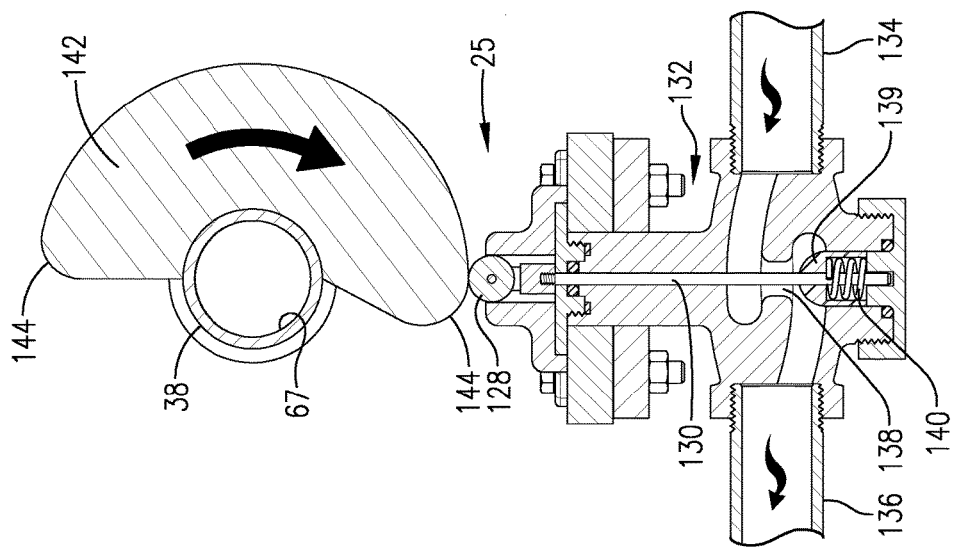
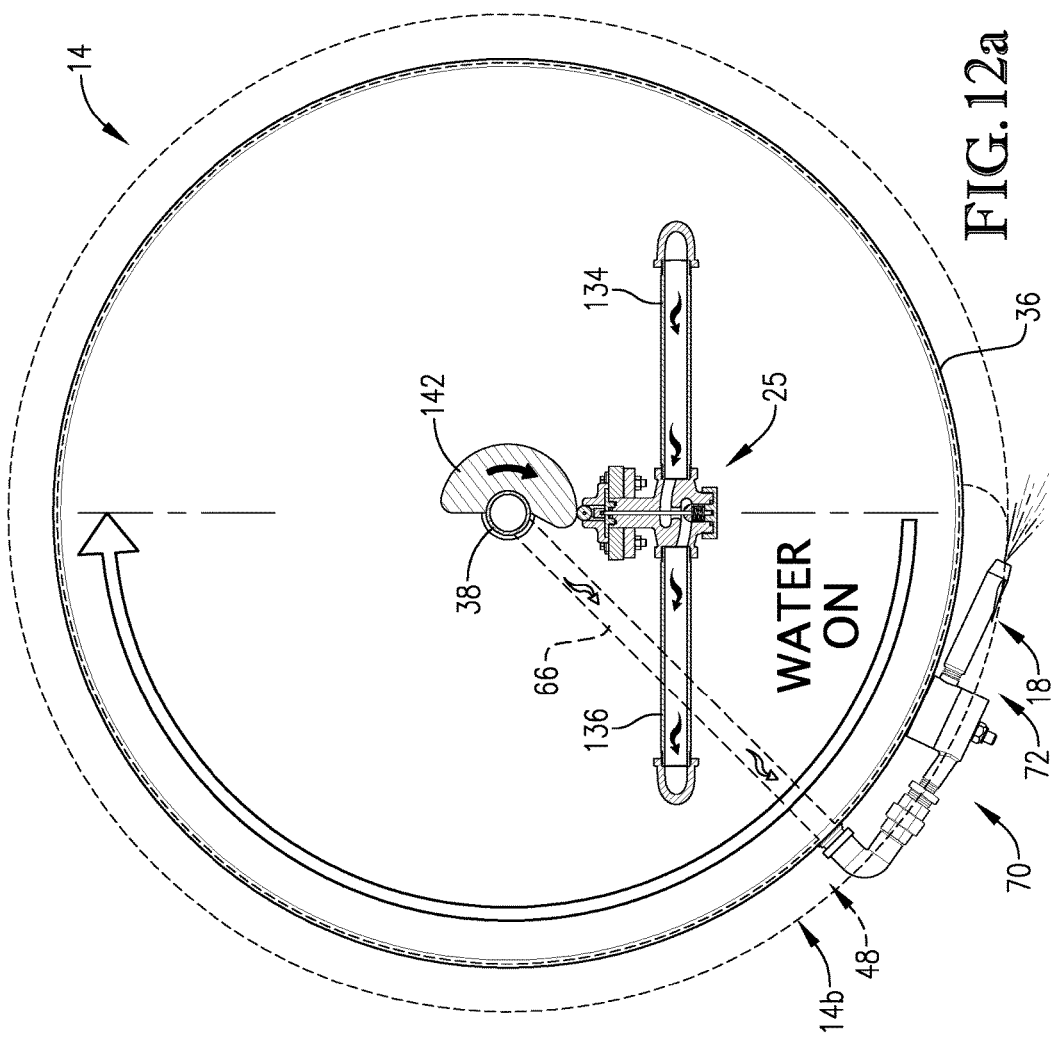
FIG.12b
FIG.12a

TRIPES CLEANING MACHINE WITH INTEGRATED CLEANING FLUID NOZZLE AND VALVE HANDLE

BACKGROUND OF THE INVENTION

1. Field of the Invention

The present invention relates generally to an apparatus including a rotating drum for flushing and cleaning tripes or intestines with cleaning fluid. More specifically, the present invention concerns equipment for controlling the flow of cleaning fluid for flushing and cleaning intestines extended across a rotating surface of the drum.

2. Discussion of Prior Art

Those ordinarily skilled in the art will appreciate that cleaning tripes is traditionally accomplished by agitating the intestines in a chamber with washing fluid, and possibly removing fat from the tripes using scarifying materials or the like. In more recent machines, rotatable drums including flightings may receive the intestines along an outer surface and rotate while cleaning fluid is flushed along the inside and outside of the intestines.

Rotating drums may provide for accelerated cleaning over the aforementioned chamber-based cleaning apparatus. However, such rotatable drum-based systems introduce significant cleaning fluid waste and potential safety concerns for operators. Over the course of a cleaning cycle using an existing apparatus, cleaning fluid is periodically (at least) lost from the apparatus and collects on surrounding surfaces. In addition, existing fluid controls often require an operator to stop the drum following each cleaning cycle in order to replace cleaned tripes with unclean tripes. Each of the shortcomings outlined above results in significant waste of time and/or cleaning fluid in existing systems for cleaning tripes.

OBJECTS AND SUMMARY OF THE INVENTION

Responsive to these and other problems, an important object of the present invention is to provide a tripes cleaning system that is efficient and highly effective in cleaning tripes. Another important object of the present invention is to provide a tripes cleaning system that is less hazardous and requires significantly less cleaning fluid to complete each cleaning cycle.

In accordance with these and other objects evident from the following description of the preferred embodiment, one aspect of the invention concerns a tripes cleaning apparatus including a rotatable drum presenting a tripes-supporting surface and an integrated fluid valve and nozzle assembly operable to selectively discharge fluid from a source into the tripes as the drum is rotated. The assembly includes a valve base fixed relative to the tripes-supporting surface and a valve body rotatable relative to the valve base into and out of a closed position. Fluid flow to the tripes is at least substantially prevented when the valve body is in the closed position. The assembly also includes a nozzle rigidly fixed to the valve body. The nozzle is elongated to present a fluid discharge opening spaced from the valve body, with swinging of the nozzle controlling rotation of the valve body into and out of the closed position.

A second aspect of the present invention concerns a tripes cleaning apparatus include a rotatable drum presenting a tripes-supporting surface and a nozzle associated with the tripes-supporting surface and operable to discharge fluid from a fluid source into the tripes as the drum is rotated. The tripes cleaning apparatus also includes an automatic valve configured to cyclically control flow from the fluid source to the nozzle in coordination with rotation of the drum.

Other aspects and advantages of the present invention will be apparent from the following detailed description of the preferred embodiment and the accompanying drawing figures.

BRIEF DESCRIPTION OF THE DRAWING FIGURES

A preferred embodiment of the invention is described in detail below with reference to the attached drawing figures, wherein:

FIG. 7a is a fragmentary, cross-sectional view of a portion of the apparatus showing a radial tube from a central distribution line for supplying cleaning fluid to the valve and nozzle assembly in the "on" configuration;

FIG. 7b is an enlarged cross-sectional view of the valve and nozzle assembly as depicted in FIG. 7a;

FIG. 12a is a cross-sectional view of the apparatus at a rotational position corresponding to transition of a direct cam-operated valve to an "on" configuration;

FIG. 12b is an enlarged view of the cam and direct cam-operated valve in an "on" configuration of FIG. 12a;

FIG. 13a is a cross-sectional view of the apparatus at a rotational position corresponding to transition of the direct cam-operated valve to an "off" configuration; and, FIG. 13b is an enlarged view of the cam and direct cam-operated valve in an "off" configuration of FIG. 13a.

DETAILED DESCRIPTION OF THE PREFERRED EMBODIMENT

Figure 1:
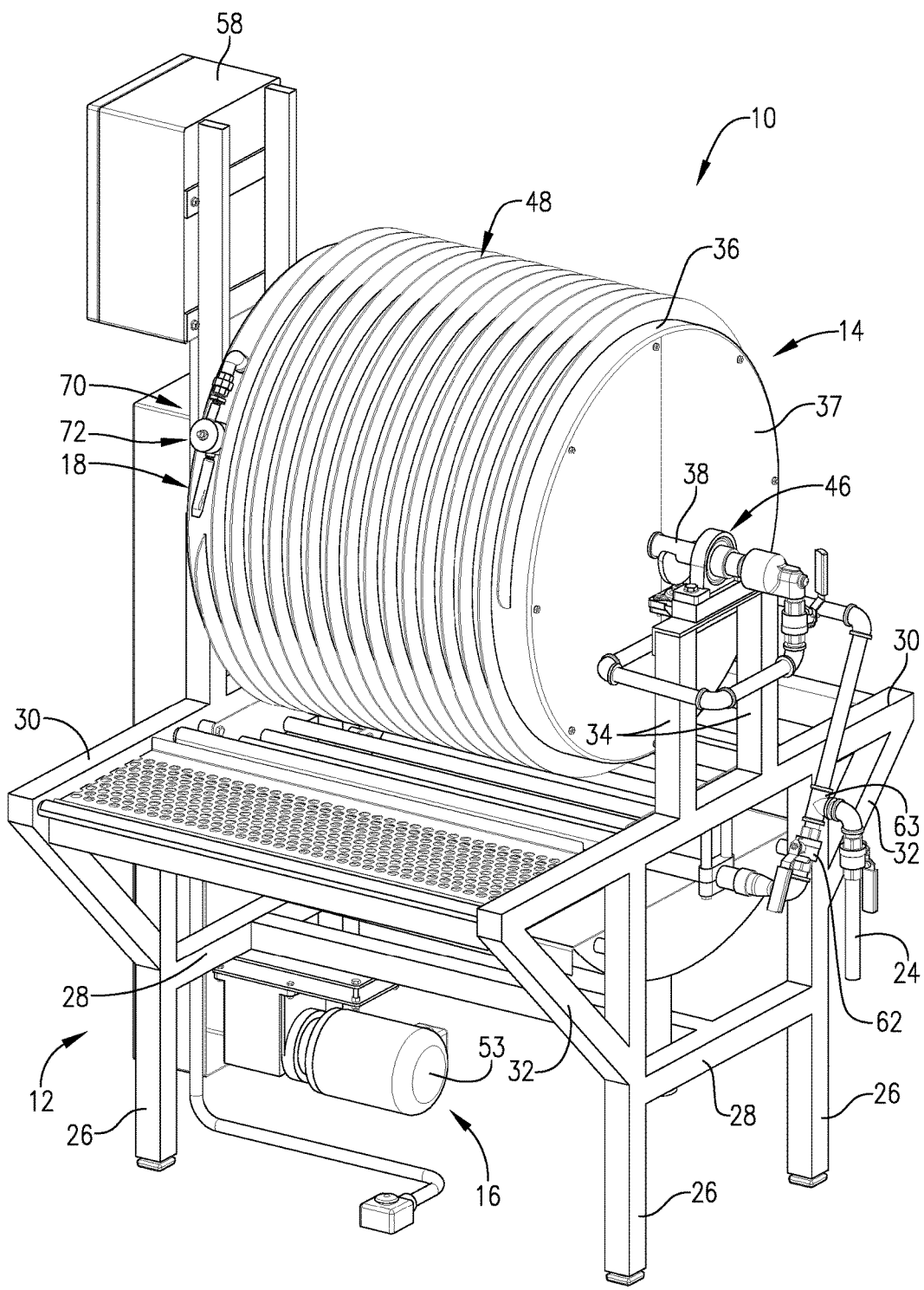
FIG. 1 is a side view of a tripes cleaning apparatus constructed in accordance with the principles of the present invention, particularly showing a water supply end of the apparatus.
Figure 2:
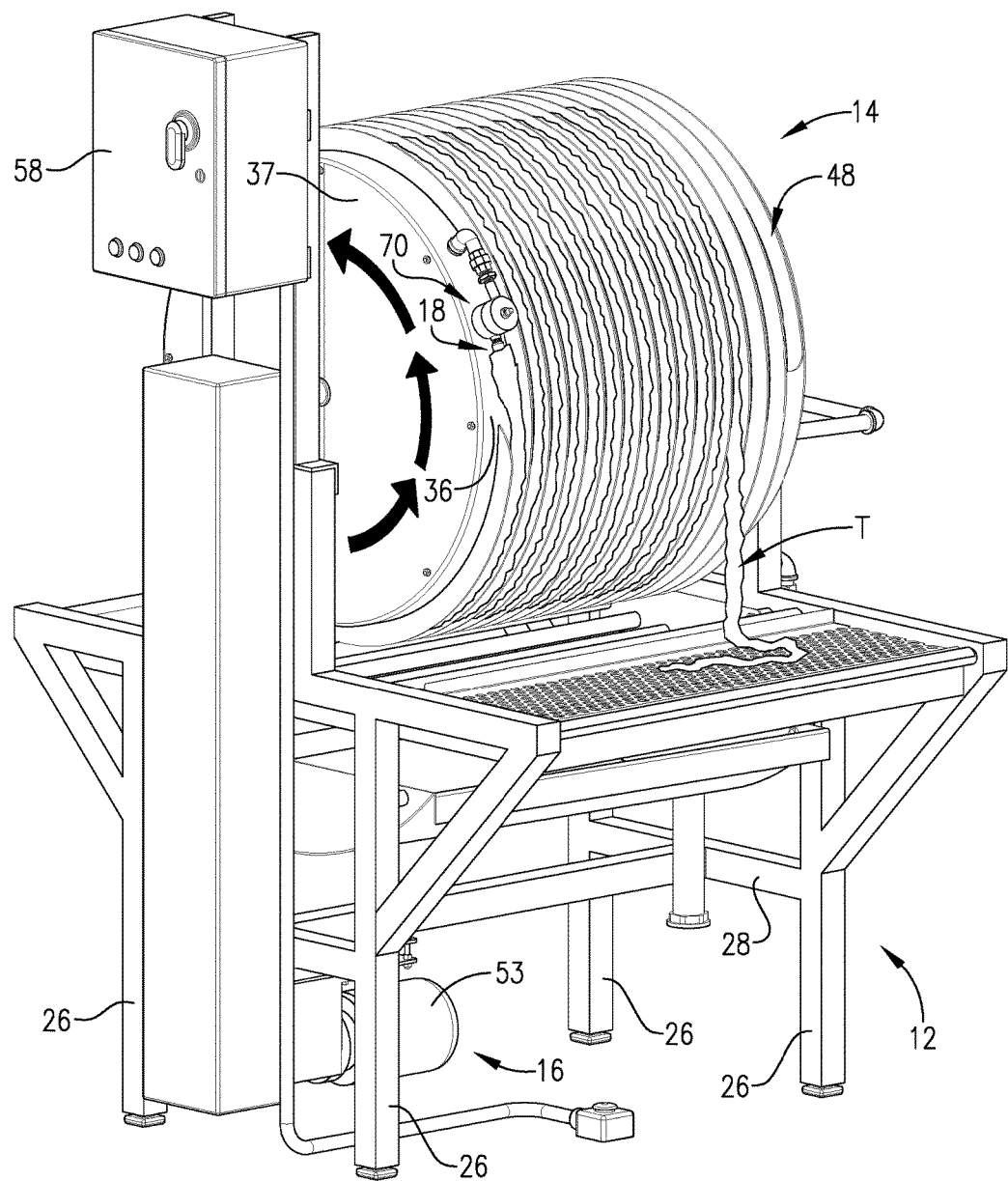
FIG. 2 is a side elevational view of the tripes cleaning apparatus of FIG. 1 taken from a rotated perspective adjacent a drive end of the apparatus.

Referring now to FIG. 1, a tripes cleaning apparatus 10 constructed in accordance with the principles of the present invention is configured to provide relatively efficient and low-waste cleaning of a tripes T (see FIG. 2). Although the apparatus may be variously configured, it is important that it be capable of supporting and revolving the tripes while flushing the tripes with cleaning fluid. With the foregoing caveat in mind, the illustrated apparatus 10 generally includes a frame 12 supporting a rotatable drum 14; a drive mechanism 16 drivingly connected to the drum 14; a nozzle 18 associated with the drum 14 for discharging fluid into the tripes T as the drum 14 is rotated; a spray bar 22 (see FIG. 5) for spraying fluid onto the outside of the tripes; a fluid supply line 24 for supplying fluid to the nozzle 18 and the spray bar 22; a partial-revolution shut-off valve 25 (see FIG. 5) for cyclically restricting and/or preventing cleaning fluid flow to the nozzle 18 based on a rotational position of the drum 14; and three troughs 40, 42 and 44 (see FIG. 3) for facilitating loading and unloading of the tripes and collecting discharged debris and fluid.

As depicted in FIGS. 1 and 2, the illustrated frame 12 preferably has four upright supporting legs 26, a pair of lower horizontal cross members 28 each extending between a corresponding pair of legs 26, and a pair of upper horizontal cross members 30 each positioned atop a corresponding pair of legs 26 and projecting laterally outward therefrom. An angled brace member 32 extends between each end of the upper cross members 30 and the adjacent leg 26 (as best shown in FIG. 1). The frame 12 further includes two vertical end arms 34 each projecting from a respective one of the upper cross members 30. The drum 14 is received and supported between the arms 34.

It will be appreciated that the illustrated frame 12 is configured for placement on a flat surface (e.g., a beef processing plant floor) so that the drum 14 is spaced above the surface at a convenient height (e.g., the drum 14 may be positioned so that its center rotational axis is approximately three to five feet above the surface). However, it is entirely within the ambit of the present invention to utilize any other alternative frame design that is capable of rotatably supporting the drum, such as a ceiling or wall mounted frame. The frame 12 can be constructed from any suitable material (e.g., stainless steel) sufficient to support the apparatus.

The rotatable drum 14 presents a tripes supporting surface 36 extending along the length of the drum. As shown in FIGS. 1 and 2, the illustrated drum 14 is generally cylindrical in shape and presents a center, longitudinal rotational axis. Each end of the drum 14 is preferably covered by an end plate 37 fixed to the drum 14 using bolts or other fasteners, although the end of the drum 14 can alternatively remain open to facilitate maintenance and service.

The drum 14 includes a shaft 38 which extends between a pair of bearing assemblies 46 provided on the vertical arms 34. The pair of bearing assemblies 46 rotatably support the shaft 38 and thereby support the drum 14 on the frame 12 for relative rotational movement. It will be appreciated that the shaft 38 defines and is positioned along the longitudinal rotational axis of the drum 14.

A flighting 48 extends in a helical arrangement about the supporting surface 36. The flighting 48 is formed of a strip of stainless steel wrapped around and attached to the supporting surface 36 by suitable means (e.g., welding, fasteners, etc), although various other materials and means for associating the flighting with the supporting surface may be used.

The flighting 48 operates to helically arrange the tripes in a single layer arrangement along the surface 36 as the drum 14 is rotated. Those skilled in the art will appreciate that tripes are naturally attached to and supported by a fat layer and along the entire length of the tripes a portion of its circumference is covered by fatty tissue remnants of the fat layer. Those skilled in the art will further appreciate that this fatty tissue is not as stretchable as intestinal tissue. This quality will naturally orient the fatty tissue side of the tripes against the surface 36 and in combination with the flighting 48 eliminates bends and kinks in the tripes. To increase the grip of the tripes on the surface 36 various materials could be adhered to the surface, for example a coarsely configured silicon carbide could be adhered to the surface using a resin. For another example, the surface 36 may be roughened or texturized adjacent the nozzle 18 to enhance the frictional interengagement between the tripes and surface and thereby restrict longitudinal shifting of the tripes relative to the nozzle 18.

The preferred and illustrated embodiment includes a single set of flighting 48. However, any number of sets of flighting can be implemented within the ambit of the invention. Preferably, an additional nozzle and associated branch from the cleaning fluid supply line are provided for use with each additional set of flighting. Additional sets of flighting may be spaced apart along the length of the drum; however, it is entirely within the ambit of the present invention to arrange multiple sets of flighting immediately one after the other along the length of the drum so that there is no space between the sets. The principles of the present invention are equally applicable to sets of flighting that are wrapped together around the drum so that each convolution or flight of a set is immediately adjacent a flight of another set.

Returning to the illustrated embodiment, the diameter of the drum 14 is preferably approximately thirty and one-half (30.5) inches. The pitch of the flighting 48 is preferably approximately one and one-half (1.5) inches. With these preferable dimensions, rotating the drum 14 at twenty (20) revolutions per minute should completely load, or wrap a tripes, onto the drum in approximately nine revolutions, or approximately thirty (30) seconds. Any workable dimensions, pitch, flighting shape and revolutionary speed could be implemented.

The drive mechanism 16 in the preferred embodiment includes an electric motor 53. Undepicted additional components of the drive mechanism 16 include a drive sheave fixed to the output shaft of the motor 53 and entrained by a belt that extends upwardly to wrap around a driven sheave fixed to the shaft 38. The illustrated embodiment uses a single speed electric motor controlled by a controller (not shown) housed in controller box 58. Other embodiments could implement any suitable drive mechanism and power source for rotating the drum. In addition, the various mechanisms implemented could be positioned in any suitable location. For example, the drive mechanism may alternatively comprise a manual hand crank. Further, the power source may alternatively comprise a variable speed motor, a gas-powered motor, a centralized power source of a processing plant, etc.

Figure 3:
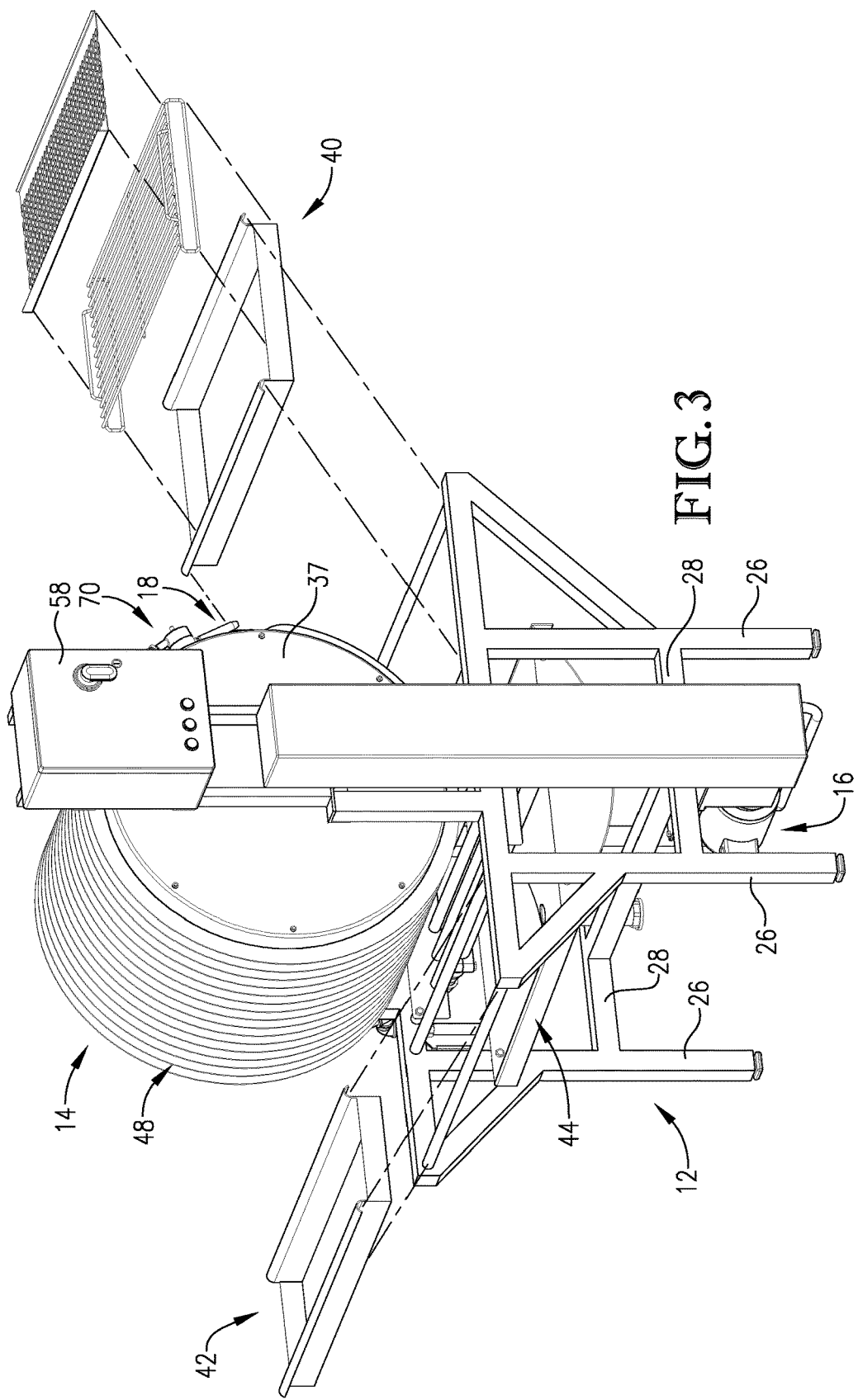
FIG. 3 is a partially-exploded view of the apparatus showing troughs for assembly generally along an underside of a drum of the apparatus.

As shown in FIG. 3, the loading trough 40 is attached to the frame 12 to be slightly under and spaced generally laterally from the drum 14. The loading trough 40 extends along the length of the drum 14. The trough 40 is provided so that the tripes are conveniently supported adjacent the drum 14 while being loaded thereon. Once the tripes have been placed in the trough 40, one end of the tripes is secured on the nozzle 18 (see FIG. 3). This preferably involves placing an end of the tripes over the nozzle 18 and attaching the tripes thereto, as will be described in more detail below, which facilitates retention of the tripes on the nozzle. The tripes is pulled out of the trough 40 and onto the drum as the drum 14 rotates. As noted above, the fighting 48 helps arrange the tripes in a single helical layer around the drum 14. The preferred embodiment has the loading trough 40 positioned on one side of the drum 14 so that the drum 14 rotates away from the loading trough 40 thereby pulling the tripes onto and over the drum 14. The loading trough 40 preferably has a triangular cross-sectional shape and is formed of stainless steel, although other materials and trough configurations are contemplated by the present invention.

On the side of the drum 14 opposite the loading trough 40 is the unloading trough 42. The unloading trough 42 is similarly supported by the frame 12 and is also preferably triangular in cross-sectional shape and formed of stainless steel. The unloading trough 42 similarly extends along the length of the drum 14 but is intended to support the tripes as it is being unloaded off the drum (i.e., as the tripes unwraps from the drum). The tripes are unloaded off of the drum 14 by removing the end of the tripes from the nozzle 18 and directing the end of the tripes into the unloading trough 42 as the drum 14 rotates. The remaining portion of the tripes should naturally fall into the unloading trough 42 as the drum rotates. It is noted that either or both troughs 40 and 42 may be provided with perforations (as shown), sloped to one end or the other, or otherwise configured to drain fluid therefrom.

In the preferred embodiment, collecting trough 44 is positioned between the loading trough 40 and the unloading trough 42. The collecting trough 44 is attached to the frame 12 at both ends and connected to the spray bar 22. The collecting trough 44 extends along the length of the drum 14 and is intended to collect the debris and fluid discharged from the tripes. It is noted that the collecting trough 44 preferably has an arcuate cross-sectional shape that is concentric with the drum 14, although other suitable trough configurations, shapes and arrangement are entirely within the ambit of the present invention. Furthermore, the collecting trough 44 is preferably formed of stainless steel. Although not illustrated, the collecting trough communicates with a suitable drain. In fact, the apparatus 10 may alternatively be designed so that fluid and debris from the tripes falls directly to the floor (not shown) on which the frame rests, with the floor preferably having a suitable drain or collection basin associated therewith.

Figure 4:
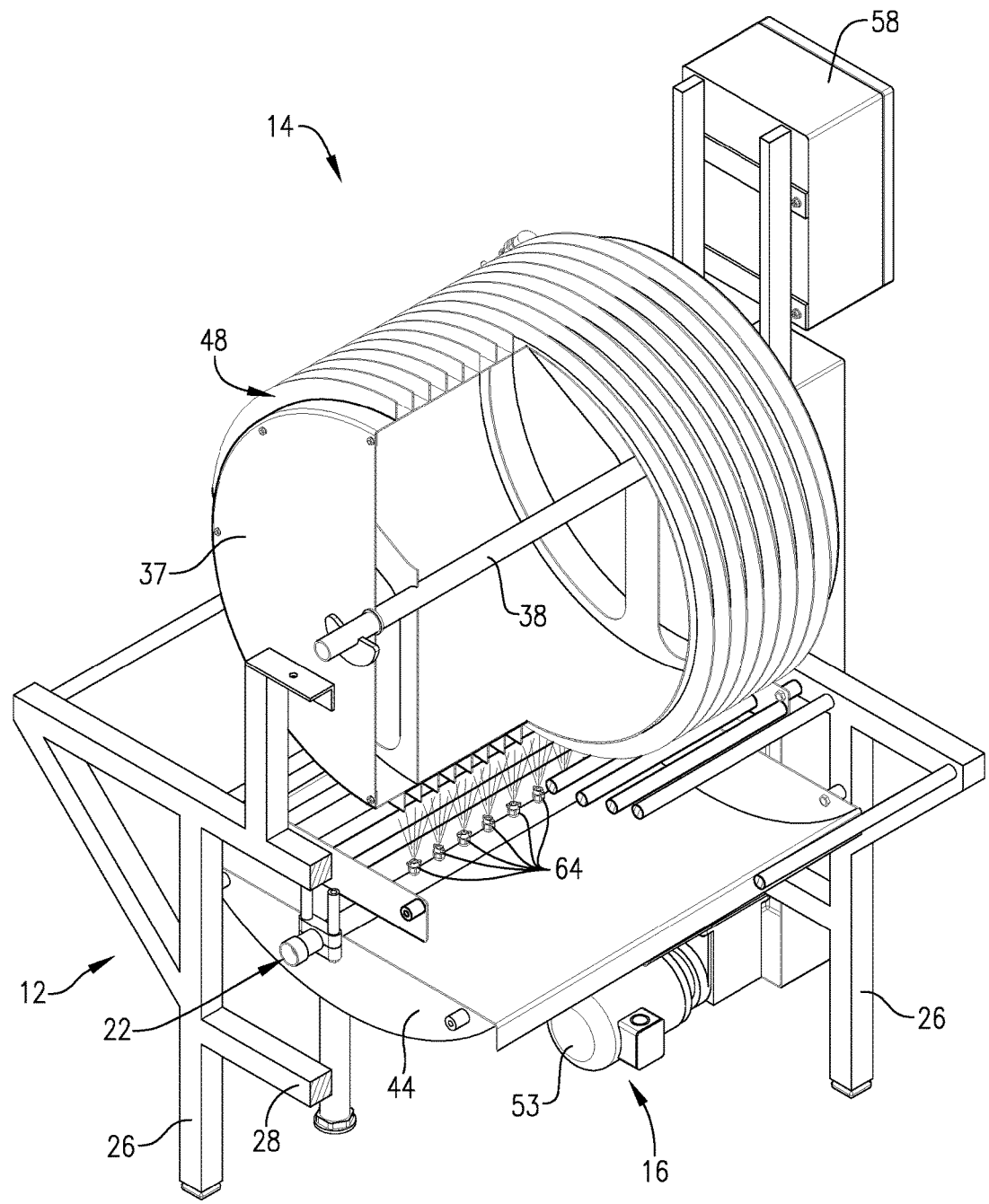
FIG. 4 is a side perspective view of the apparatus, with portions of a drum and surrounding structure being removed to reveal an interior of the drum and the underlying spray bar.

In the illustrated embodiment, the spray bar 22 operates to clean the exterior of the tripes by spraying fluid onto the outside of the tripes while the drum 14 is rotated. Fluid is supplied to the spray bar 22 from the fluid source by the supply line 24. A valve 62 interposed along the supply line 24 downstream from a tee fitting 63—dividing flow between the spray bar 22 and the nozzle 18—but upstream from the spray bar 22, is provided for controlling fluid flow to the bar 22. Accordingly, the valve 62 may be closed to prevent fluid flow to the spray bar 22, but such closure of the valve 62 does not prevent flow to the nozzle 18. This allows a person operating the tripes cleaning apparatus 10 to prevent the supply of fluid to the spray bar 22 to avoid getting sprayed while working near the apparatus 10 (for example, to cut a tripes at a nick and reattach the cut portion of the tripes onto a next available nozzle), yet still allow for the tripes rotating on the apparatus 10 to continue to be supplied with fluid through the nozzle 18. In the illustrated embodiment, the spray bar 22 includes jets 64 spaced along the length of the bar (e.g., see FIGS. 4 and 5). The jets 64 operate to jet fluid onto the outside of the tripes. In essence, the exterior of the tripes is cleaned automatically as it is supported on the drum 14. It will be appreciated, however, that other suitable methods of cleaning the outside of the tripes are entirely within the ambit of the present invention. For example, the apparatus may alternatively be provided with multiple spray bars, an alternatively configured bar(s) (e.g., a tubular bar having spaced apart openings), a handheld spray wand, a moveable sprayer, etc.

Figure 5:
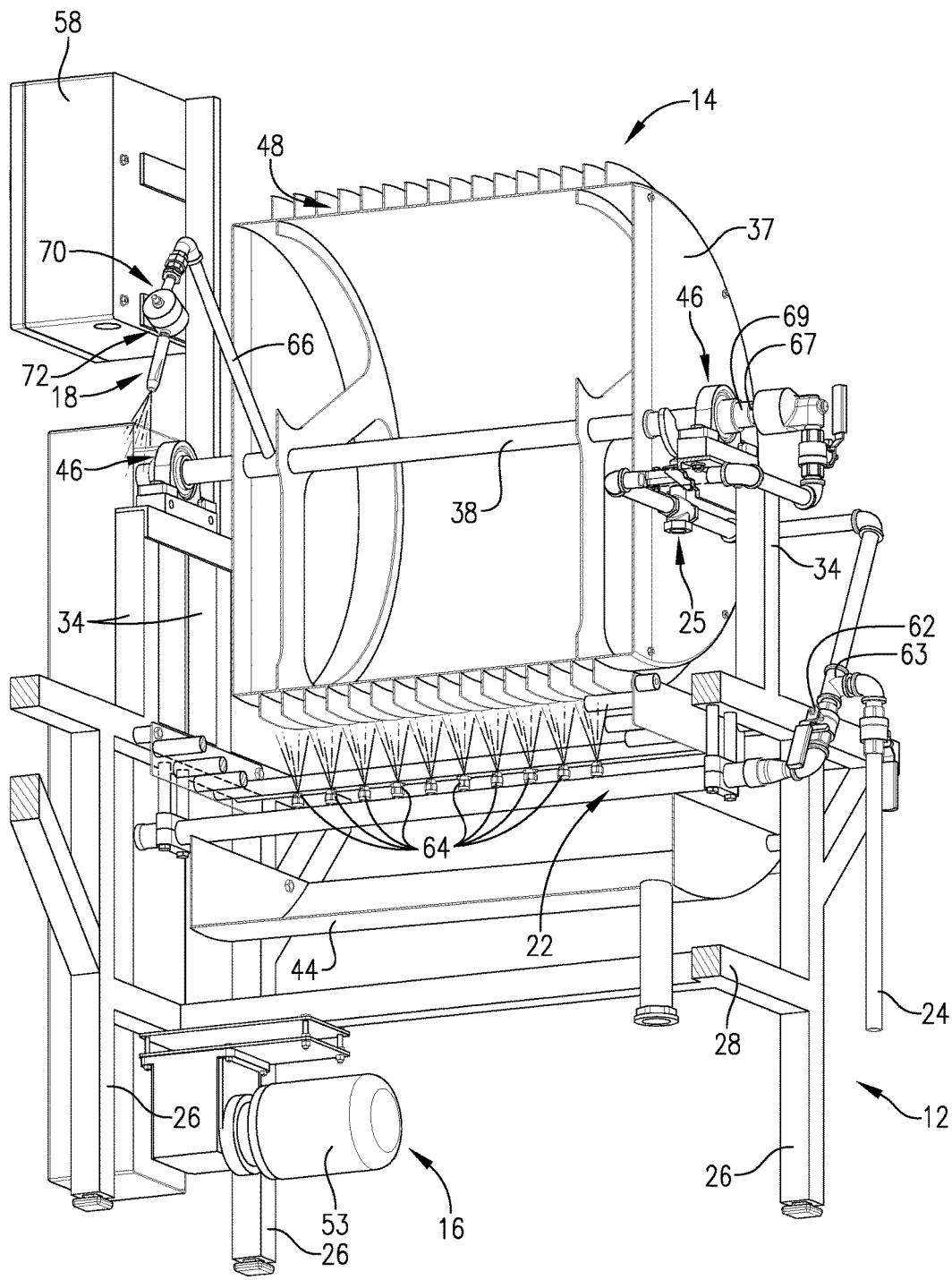
FIG. 5 is a de-elevated perspective side view of the apparatus, with portions of the drum and surrounding structure being removed to reveal the interior of the drum and aspects of an underlying spray bar.

As perhaps best shown in FIG. 5, the nozzle 18 is connected to the supply line 24 by a separate radial tube 66 projecting from a central distribution line 67. The distribution line 67 extends at least substantially the full length of the drum 14 and supplies fluid to the radial tube 66. Furthermore, the distribution line 67 projects through the corresponding shaft 38 to connect to the supply line 24 by a suitable swivel connection 69. It is noted that the fluid supply line 24 projects from or is connected to a source of tripes cleansing fluid (e.g., a pump connected to a fluid solution reservoir, water tap, etc). Accordingly, the nozzle 18 operates to discharge fluid into the tripes as the drum is rotated. It is further noted that the hollow configuration of the drum 14 and removable end plates 37 are particularly desirable in light of the above-mentioned plumbing components preferably being located within the drum 14.

Turning now to FIGS. 6-11, the cleaning fluid control equipment of the preferred apparatus 10 includes an integrated valve and nozzle assembly 70. More particularly, the assembly 70 preferably comprises a valve 72 including the nozzle 18. The valve 72 includes a base 73 fixed relative to the tripes supporting surface 36. As perhaps best seen in FIGS. 10-11, the base 73 preferably comprises an inlet casing 76. The valve 72 also includes a valve body 75 comprising an outlet casing 78. The inlet casing 76 preferably presents a substantially planar inner face 80, and the outlet casing 78 preferably presents a substantially planar inner face 82.

A bolt 84 embedded in the outlet casing 78 extends substantially orthogonally from the inner face 82. The inlet casing 76 defines a complementary orifice 85 for receiving the bolt 84 upon assembly of the inlet casing 78 and the outlet casing 78, with the bolt 84 being secured along a backside of the inlet casing 76 by a washer and nut 86. More particularly, the inlet casing 76 and the outlet casing 78 are preferably held in contact along inner faces 80, 82 by assembling the inlet casing 76 over the bolt 84 and into proximity with the outlet casing 78, and then tightening the nut 86 along the bolt 84. Preferably, the nut 86 is tightened to a degree that ensures a tight seal for fluid transfer across the inner faces 80, 82 and that enough friction is generated along the slidably interengaging inner faces 80, 82 to substantially prevent inadvertent rotation of the outlet casing 78 with respect to the inlet casing 76. Moreover, each of the inner faces 80, 82 is preferably smoothed—for example by sanding, polishing, filing or the like—to reduce wear and tear on the inlet and outlet casings 76, 78.

Returning briefly to details of the base 73, the inlet casing 76 is fixed to an inlet pipe 88, preferably at a welded joint. The opposite end of the inlet pipe 88 is preferably fixed to a substantially ninety degree (90°) elbow 90 at a threaded fitting including a coupling nut. The opposite end of the elbow 90 is fixed to the drum 14 at a welded joint. As perhaps best illustrated in FIGS. 7 & 9, the relative orientations of the drum 14, elbow 90, inlet pipe 88, and valve 72 preferably result in the valve 72 extending outside the supporting surface 36, and in fluid flow spraying from the discharge opening of the nozzle 18 (see discussion below), substantially tangentially to the cylindrical drum 14.

It is foreseen that varying structure may support the valve 72 on the drum 14 in a similar orientation without departing from the spirit of the present invention. Alternative and/or additional means of fixing various supporting structure together and/or to a valve and/or a drum—such as snap or friction fittings or the like—may also be used without departing from the spirit of the present invention. One of ordinary skill will also appreciate that it is clearly within the ambit of the present invention for one or more such supporting structure to be integral with and/or welded permanently to a valve. It is also foreseen that an elbow may present an angle other than ninety degrees (90°), and/or that a valve may extend other than tangentially with respect to the drum, without departing from the spirit of the present invention.

Figure 6:
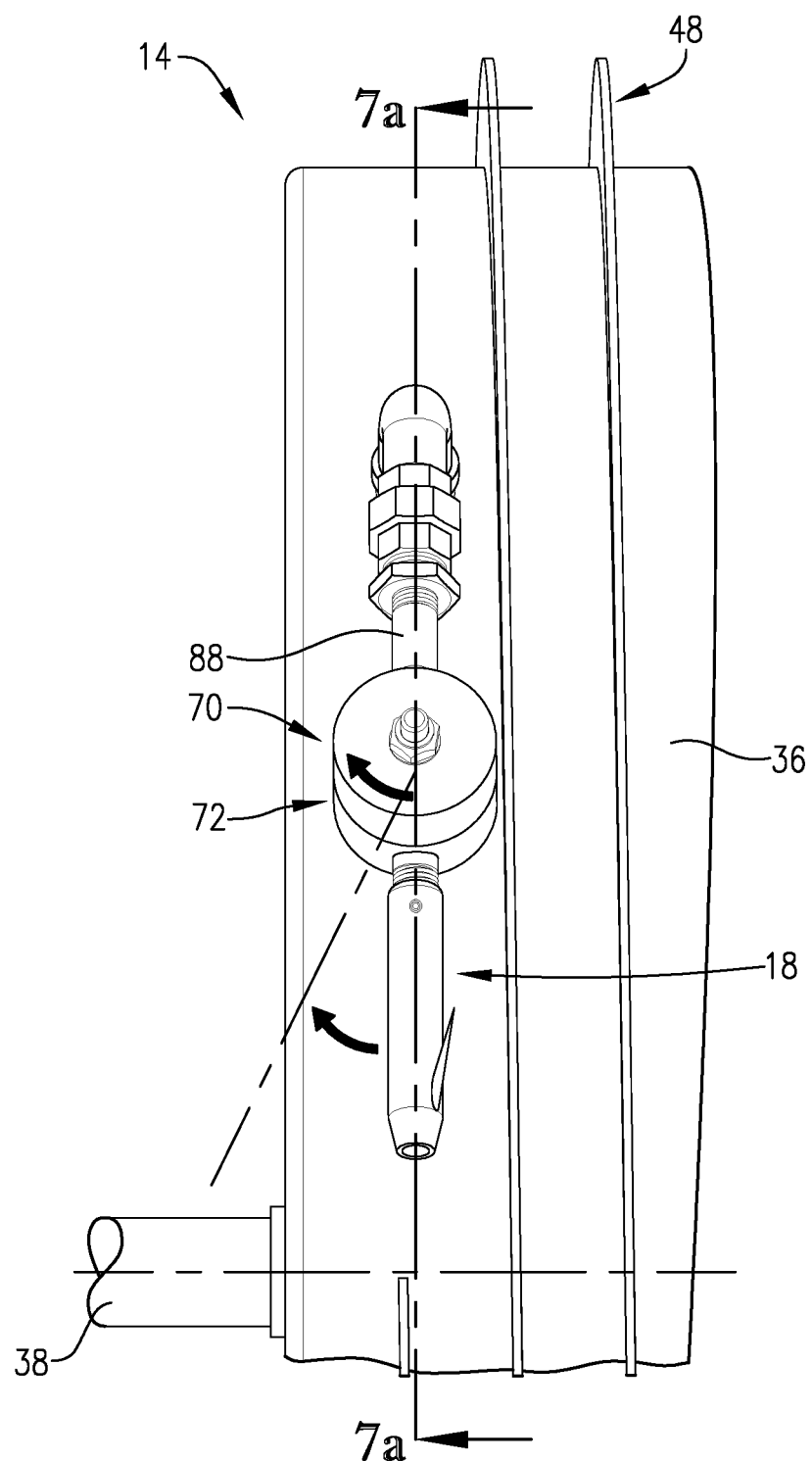
FIG. 6 is a fragmentary, lateral side view of a portion of the apparatus, particularly showing a valve and nozzle assembly in a straight, "on" configuration.
Figure 8:
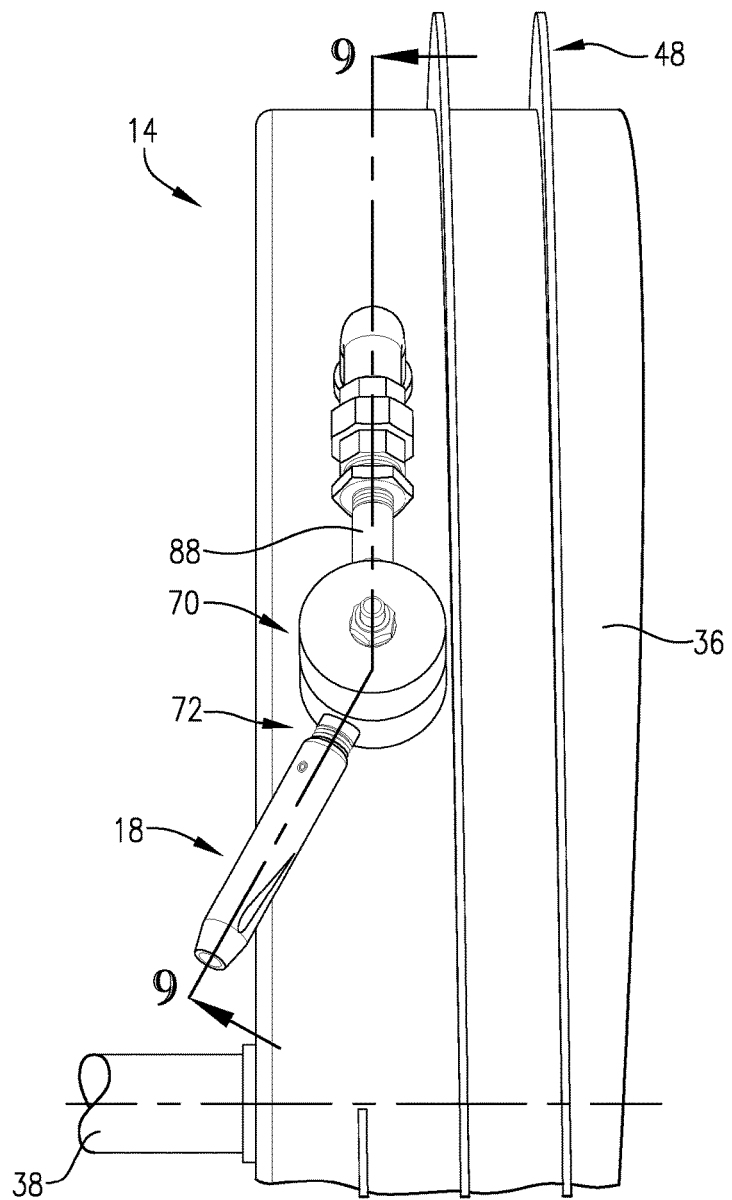
FIG. 8 is a fragmentary, sectional, lateral side view of the valve and nozzle assembly in an angled "off" configuration.
Figure 9:
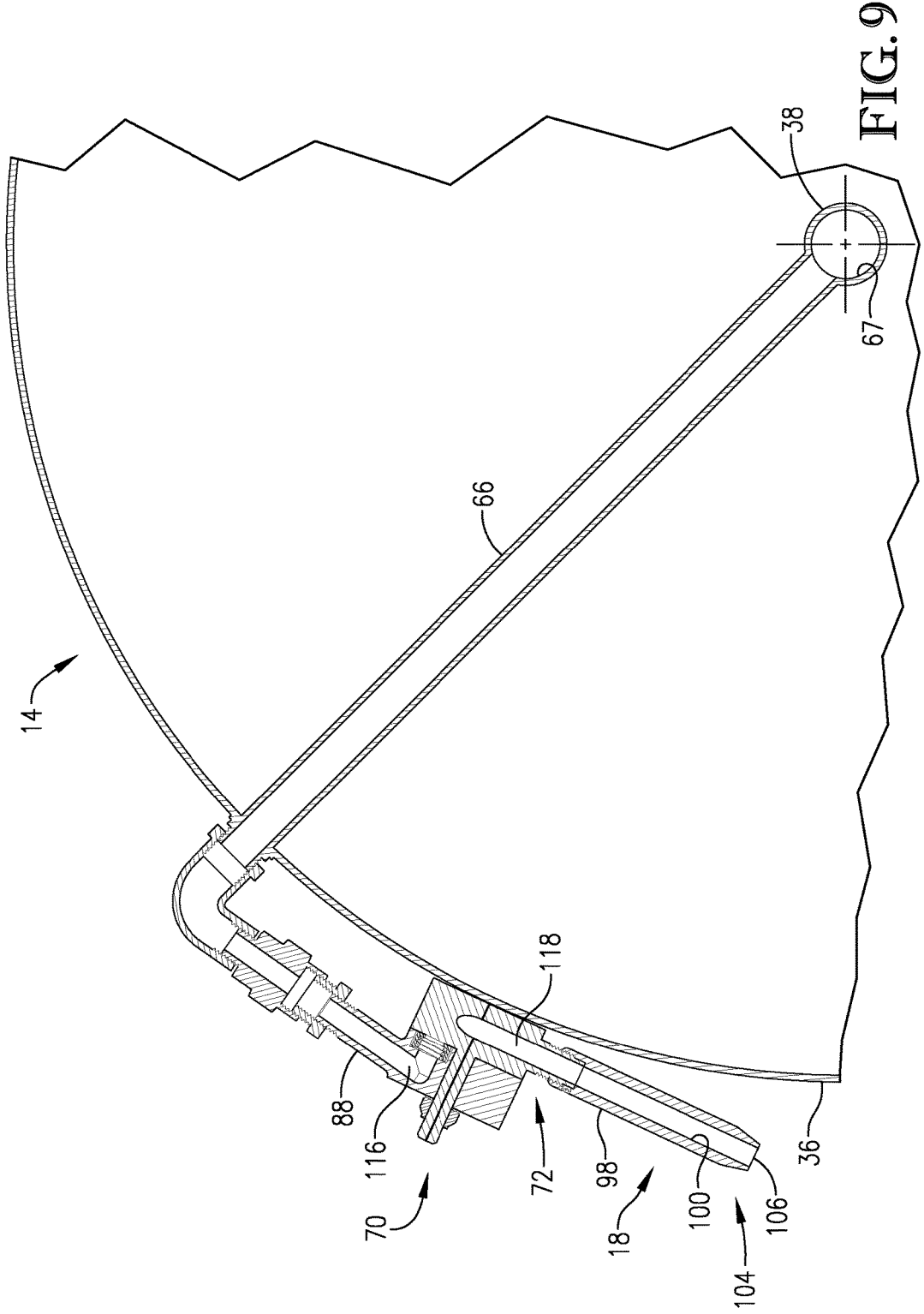
FIG. 9 is a fragmentary, cross-sectional view of a portion of the apparatus similar to FIG. 7a, but showing the valve and nozzle assembly in an angled "off" configuration.

As perhaps best shown respectively in FIGS. 6 & 8, the outlet casing 78 and nozzle 18 preferably transition between "on" and "off" positions—respectively enabling and disabling fluid communication with the cleaning fluid source—by pivoting about the bolt 84 in a single plane that is substantially parallel to the inner faces 80, 82. In the preferred embodiment, the bolt 84 will define (or the outlet casing 78 and nozzle 18 will otherwise pivot about) a body axis transverse or substantially transverse to the rotational axis of the drum. The nozzle 18 operates to discharge fluid when the inlet pipe 88 and nozzle 18 are substantially aligned (see FIG. 6) and to restrict or prevent fluid discharge when angled relative to one another (see FIG. 8), as described in more detail below.

Turning again to FIGS. 10-11, the valve body 75 includes a rigid outlet pipe 94 preferably welded to extend radially outward from the outlet casing 78. The outlet pipe 94 preferably includes an outer surface 95 having threaded 95*a* and un-threaded 95*b* regions. The elongated nozzle 18 includes a rigid tube section 96 having an outer surface 98 and an inner surface 100. The tube 96 extends between a proximal inlet end 102 and a distal outlet end 104. The inlet end 102 is preferably threaded along the inner surface 100 to rigidly fix the nozzle 18 to the outlet pipe 94. The outlet end 104 of the tube 96 defines a discharge opening 106 spaced from the valve body 75 where the inner surface 100 meets the outer surface 98 (see FIG. 9). Preferably, the fluid discharge opening 106 is spaced at least two inches (2") from the valve body 75. More preferably, the fluid discharge opening 106 is spaced at least four inches (4") from the valve body 75. The aforementioned spacing may provide sufficient leverage for ease of operating the valve 72 while avoiding an undesirable degree of protrusion of the discharge opening 106 beyond the outer margin of the drum 14 (discussed below).

The nozzle 18 also includes a barb 108 extending outwardly from the outer surface 98 near the outlet end 104 and rearwardly to a tip 109 pointing generally toward the inlet end 102.

Upon assembly of the valve 72, or during adjustment of the nozzle 18 for use, the threaded portion of the inlet end 102 may be screwed along the threaded region 95*a* of the outlet pipe 94 for rigid mating engagement therebetween. Preferably, the threaded portion of the inlet end 102 and the threaded region 95*a* of the outlet pipe 94 extend longitudinal distances sufficient to ensure secure mating engagement therebetween throughout at least one entire revolution of the nozzle 18. In this manner, the barb 108 may be rotationally adjusted within a full three hundred and sixty degrees (360°) of movement without losing secure engagement between the nozzle 18 and the outlet pipe 94.

A threaded set screw 110 (see FIG. 10) is preferably also provided to releasably secure the nozzle 18 to the outlet pipe 94. The tube 96 may include an arcuate threaded surface extending radially through a wall of the tube 96 to define an orifice 97 sized to receive the set screw 110. The set screw 110 may be threaded through the radially-extending orifice 97 for mating engagement therebetween. The set screw 110 may be rotated further to partially extend beyond the inner surface 100 to engage the un-threaded region 95*b* of the outlet pipe 94. The set screw 110 may be tightened and compressed against the un-threaded region 95*b* sufficiently to ensure the desired degree of immobility of the nozzle 18 with respect to the outlet pipe 94. It is foreseen that the set screw 110 may alternatively be compressed against a threaded portion 95*a* of the outlet pipe 94 without departing from the spirit of the present invention. Valves that include different releasable fasteners for securing movement of a nozzle relative to an outlet pipe, or that include no such fasteners at all, are also clearly within the ambit of the present invention. Moreover, it is foreseen that a tube may be integral with and/or welded to an outlet pipe without departing from the spirit of the present invention.

Figure 10:
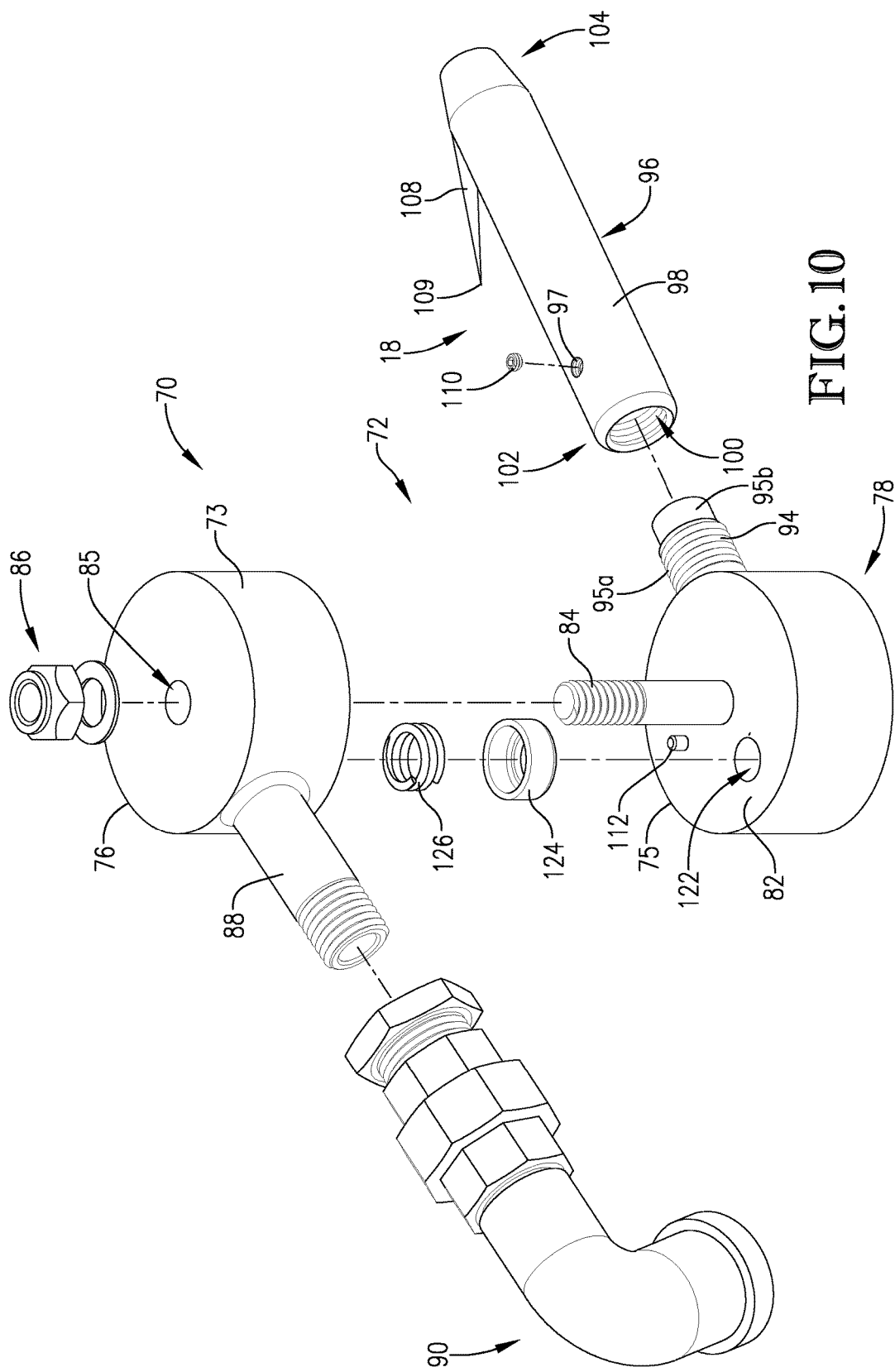
FIG. 10 is an exploded view of the valve and nozzle assembly from a perspective oriented generally behind an outer face of an inlet casing.
Figure 11:
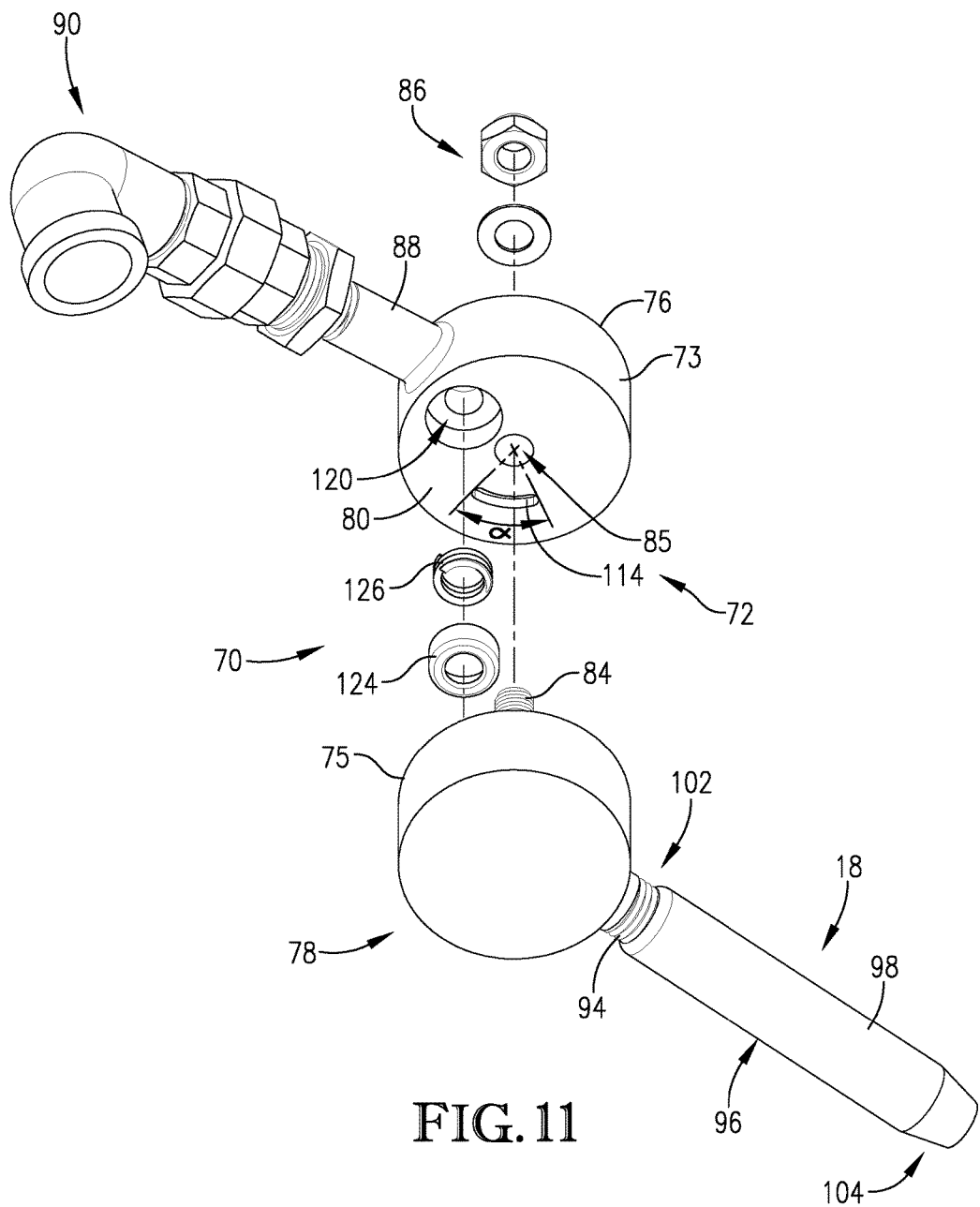
FIG. 11 is an exploded view of the valve and nozzle assembly of FIG. 10 from a perspective rotated generally to an opposite side of the assembly.

Returning briefly to FIGS. 6 & 8, rotation of the outlet casing 78 relative to the inlet casing 76—i.e., between "on" and "off" positions of the valve 72—is preferably restricted to a pre-determined range. More particularly, as illustrated in FIGS. 10 & 11, a pin 112 and a groove 114 may be provided respectively along inner faces 82, 80 to restrict the range of rotational movement y of the outlet casing 78. The pin 112 may slide within the groove 114 between the two endpoints of the groove 114 as the outlet casing 78 twists, with the endpoints corresponding to the range of rotational movement y of the valve 72. For example, y may be approximately thirty degrees (30°), or, more preferably, approximately one half of one radian (0.5°) or slightly less.

The pin 112 may be secured to the outlet casing 78 using any acceptable means, such as adhesives, welding or the like, without departing from the spirit of the present invention. It is also foreseen that y may vary—for example, in view of the diameter of associated flow orifices discussed in more detail below and/or of gaskets etc. of a valve—without departing from the spirit of the present invention. Moreover, other structure tending to limit rotational movement of an outlet casing relative to an inlet casing to a pre-defined range are clearly within the ambit f the present invention.

Figure 7B:
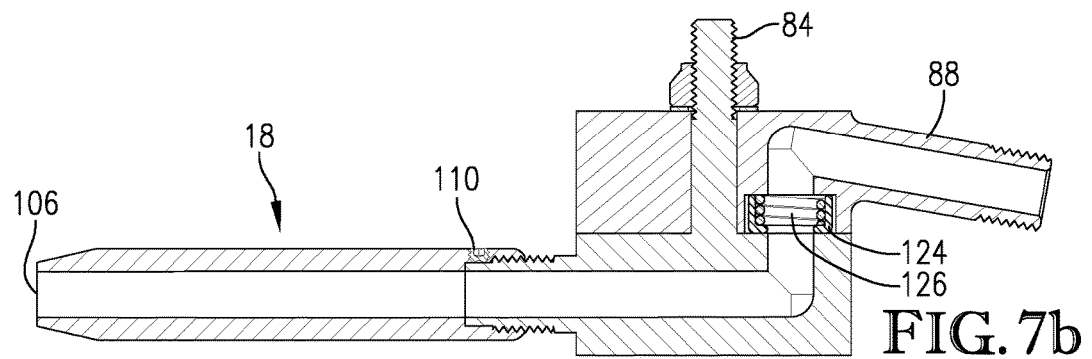

Turning now to FIG. 7*a*, it is again noted that the "on" position of the valve 72 generally corresponds to at least partial alignment of the outlet pipe 94 and nozzle 18 with the inlet pipe 88. In the "on" position, an inlet fluid flow passage 116 defined within the inlet casing 76 is fluidly connected to an outlet fluid flow passage 118 defined within the outlet casing 78. The interface between the aforementioned passages 116, 118 is generally along the inner faces 80, 82. That is, the inlet passage 116 intersects inner face 80 and the outlet passage 118 intersects inner face 82.

As best seen in FIGS. 10 & 11, an inlet orifice 120 is defined in the inner face 80, and an outlet orifice 122 is defined in the inner face 82. At least partial alignment of the inlet orifice 120 and outlet orifice 122 in the "on" position preferably provides the fluid connection between the passages 116, 118, enabling fluid flow from the cleaning fluid source to the discharge opening 106. Conversely, misalignment of the inlet orifice 120 and the outlet orifice 122 corresponds to the "off" position. In the illustrated embodiment, the "off" position therefore includes all rotational positions within the range of rotational movement y in which the inlet orifice 120 and the outlet orifice 122 are not at least partially aligned.

Moreover, a gasket 124 is preferably provided for sealing the fluid connection between the inlet orifice 120 and the outlet orifice 122. The gasket 124 may be biased for movement toward one of the inlet casing 76 and the outlet casing 78. A spring may be provided and coupled relative to one of the valve base 73 and the valve body 75 for yieldable urging against the other of the valve base 73 and the valve body 75. For example, the spring may be coupled relative to one of the passages 116, 118 for yieldable urging against the inner face 80, 82 associated with the other of the passages 116, 118.

In the preferred embodiment, a spring 126 may be embedded or otherwise seated in the inlet orifice 120 behind and in operable contact with the gasket 124. The spring 126 may tend to press the gasket 124 toward the outlet casing 78. This spring-loaded pressure, alone or in conjunction with the pressure of fluid flow from the inlet casing 76 toward the outlet casing 78, preferably enhance(s) the seal around the fluid connection between the passages 116, 118. For instance, where the inlet orifice 120 is substantially aligned with the outlet orifice 122 in the "on" position, the spring 126 may urge the gasket 124 partly across the inner face 82 and into the outlet orifice 122, with some of the gasket 124 remaining within the inlet orifice 120, to form an improved seal across the interface between the passages 116, 118.

It is preferred to include an integrated valving and nozzle assembly—such as the one described herein in connection with the illustrated embodiments of the invention—for controlling fluid flow from a nozzle. However, embodiments of the present invention are applicable to nozzles having no such valving mechanism, for example a continuously open fluid discharge spigot, and to systems providing a flow control valve for a nozzle that is not integral with the nozzle.

Figures 13A, 13B:
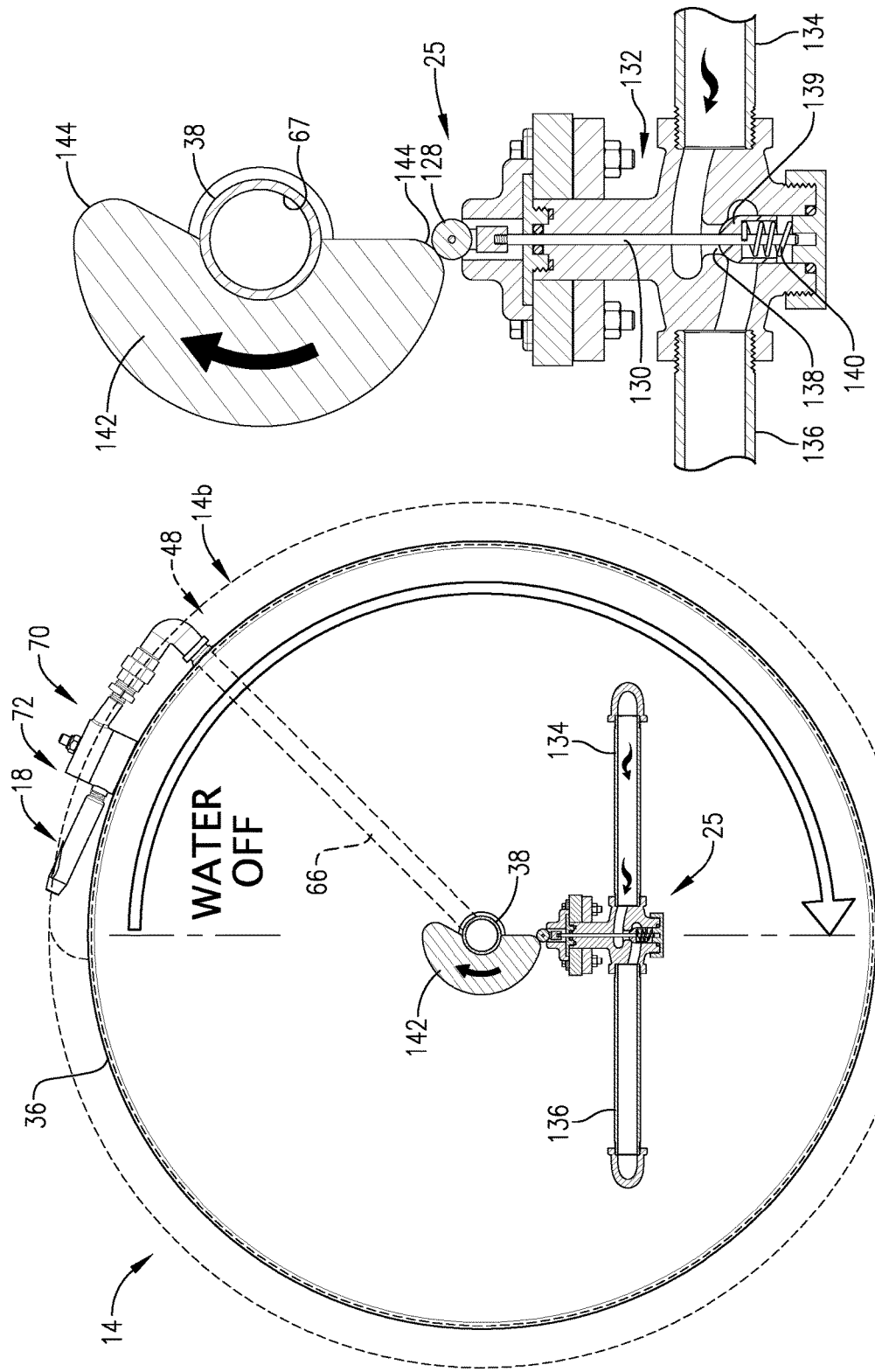

Turning now to FIGS. 12 & 13, the cleaning fluid control equipment of the apparatus 10 preferably also includes the automatic, partial-revolution shut-off valve 25. Referring briefly to FIG. 5, the valve 25 is preferably interposed along the supply line 24 downstream from the tee fitting 63 but upstream from the central distribution line 67. Accordingly, the valve 25 may be closed to restrict or prevent fluid flow to the nozzle 18, but such closure of the valve 25 does not prevent flow to the spray bar 22. This allows a reduction in cleaning fluid flow, and in undesirable fluid losses to surfaces surrounding the apparatus 10, during part of the revolution of the drum 14, yet still allows for the tripes rotating on the apparatus 10 to continue to be rinsed with fluid sprayed by the jets 64 spaced along the length of the bar 22 (e.g., see FIGS. 4 and 5).

The valve 25 is preferably a plunger valve of known construction, such as the 3/NG06 CETOP Direct Cam Operated valve (part number AD3D16E) sold under the trademark ARON®. Other types of valves, such as electrically-actuated solenoid valves that may be responsive to sensor feedback regarding the rotational position of a drum, for example, are also clearly within the ambit of the present invention. Moreover, it is foreseen that no partial-revolution shut-off valve may be employed without departing from certain aspects of the present invention.

The exemplary plunger valve 25 illustrated in FIGS. 12 & 13 includes a cam follower or roller 128 rotatably mounted atop a rod or stem 130. The stem 130 extends substantially vertically through a casing 132. The casing 132 receives an inlet side portion 134 of the supply line 24 and an outlet side portion 136 of the supply line. An intermediate passage 138 is fluidly connected to the inlet side portion 134 and the outlet side portion 136. The stem 130 is fixed to a plunger disk 139 which, in turn, is operably coupled to a spring 140 seated in the casing 132.

The spring 140 is preferably biased to ensure consistent sliding or rolling contact between the roller 128 and a cam 142 mounted on the shaft 38 during at least half of each revolution of the drum 14 and, preferably, during each full revolution of the drum 14. The valve 25 may therefore cycle into the "off" position at least once per revolution of the drum 14, and may substantially prevent cleaning fluid flow during about one half (½) of each revolution. It is also foreseen that a valve may cycle between "on" and "off" positions, and/or between other reduced flow rate positions, more or fewer times per revolution without departing from the spirit of the present invention. Moreover, only intermittent contact between a cam and a roller or other portion of a valve stem may be required to properly control cleaning fluid flow without departing from the spirit of the present invention.

The cam 142 preferably substantially maintains contact with the roller 128 throughout at least half of each revolution of the drum 14 and thereby directly controls the position of the plunger disk 139 within the intermediate passage 138. Throughout the majority of a half-revolution of the drum in which a spray direction of the nozzle 18 has a generally upward component (see FIG. 13), the cam 142 preferably releases or substantially lessens the downward pressure applied on the stem 130. The spring 140 is permitted to at least partly uncoil, pressing the plunger disk 139 upward within the intermediate passage 138 to substantially restrict or prevent cleaning fluid flow from the inlet side portion 134 to the outlet side portion 136. Following a full half-revolution, a corresponding return of the nozzle 18 to a position in which the spray direction has a generally downward component corresponds to the cam 142 again depressing the stem 130 so that the plunger disk 139 is pressed downward into the casing 132 to open the fluid connection between the inlet side portion 134 and the outlet side portion 136 via the intermediate passage 138.

One of ordinary skill will also note that the cam 142 includes rounded noses or peaks 144 that smooth transitions between the "on" and "off" positions of the valve 25. As the roller 128 travels over the rounded peaks 144 between each half-revolution of the drum 14, the cleaning fluid flow rate either steadily increases or decreases in respective transitional phases. It is also foreseen that a partial-revolution shut-off valve may substantially maintain other intermediate flow rates during part or all of one or both half-revolutions without departing from the spirit of the present invention. One of ordinary skill will also appreciate that a partial-revolution shut-off valve may cycle between flow rates on other than half-revolution bases within the ambit of the present invention. As used herein, "substantially reduce" or "substantially prevent" mean, assuming constant fluid pressure from the fluid source, to reduce flow below that experienced when the orifices 120, 122 are fully aligned and the plunger disk 139 is fully depressed. In the most preferred embodiment, such flow will be substantially stopped and, preferably, completely prevented.

Returning to FIGS. 2-3, the tripes to be cleaned on the tripes cleaning apparatus 10 are initially loaded onto the drum 14 by placing the tripes in the loading trough 40. The operator may also ensure that the drum 14 is positioned so that the spray direction of the nozzle 18 has a generally downward component (e.g., the drum 14 is oriented so that the side bearing the nozzle 18 generally faces the trough 40).

In many cases, the drum 14 is preferably permitted to continue its rotation throughout a tripes change-out process such as the one described below, which may provide for increased efficiency and less wasted time as a new tripe is exchanged for a cleaned tripe on the drum 14. The preferred embodiment of the valve 72, as described and illustrated herein, is particularly well-suited for change-out processes not requiring stoppage of the drum 14.

To attach a tripe to the apparatus 10, an end of the tripe is positioned over the barb 108 as the nozzle 18 is in a bent or angled configuration as shown in FIG. 8 so that the discharge opening 106 is inside the end of the tripe. In the preferred embodiment, the nozzle 18 may be swivelled about a longitudinal axis of the tube section 96 to adjust the position of the barb 108 to suit user preference. The set screw 110 may be at least partly unscrewed to release the nozzle 18 for swivelling adjustment, and may be screwed into a compression fit against the outlet pipe 94 once the nozzle 18 is in the desired position to prevent further swiveling. The tripe may also be pressed down against the barb 108 so that the tip 109 at least partially pierces the tripe, to ensure secure attachment therebetween.

Preferably following secure attachment of the tripe to the barb 108, the nozzle 18 may be rotated and, by virtue of the rigid connection to the valve body 75, may bring the valve 72 to the straightened "on" position. Also in the preferred embodiment, the shift between "off" and "on" positions occurs substantially or entirely within a plane substantially transverse to the axis of rotation of the drum 14. More preferably, at least a portion of the discharge opening 106 remains radially inside an outer margin 146 of the drum 14, the outer margin 146 generally corresponding to the radially outermost extent of the adjacent fighting 48 (see FIGS. 12 and 13).

In the preferred embodiment, adjustability of the nozzle 18 within the spatial parameters described above may be advantageous for a number of reasons, specifically in systems that do not require stoppage of the drum 14 for tripes change-out. More particularly, adjustability of the nozzle 18 between "on" and "off" positions, wherein at least a portion of the discharge opening 106 remains radially within the outer margin 146, may provide several advantages. Such advantages are preferably enhanced by adjustability of the nozzle 18 about two axes within the outer margin 146.

First, adjustability about two axes preferably maximizes operator comfort during the tripes change-out process. Second, maintaining the discharge opening 106 at least partly inside the outer margin 146 during such adjustments may reduce "settling" of the tripe out of its originally-attached position, which, in turn may reduce unwanted flagging of the tripe from the supporting surface 36 during the cleaning process. Third, attaching the tripe to the nozzle 18 in a bent configuration (again, see FIG. 8) with respect to the generally circumferentially extending flighting 48 about which the tripe is arranged may initially "kink" the tripe during the attachment process. This "kink"—again, formed substantially during the attachment process—may help temporarily reduce the flow of liquid and materials into and out of the tripe, which may be generally desirable during the change-out process. Fourth, maintaining at least a portion of the discharge opening 106 within the outer margin 146 may help reduce the likelihood of collision between the nozzle 18 and surrounding structure, such as operable portions of the troughs 40, 42, 44 and/or jets 64 that extend generally along the length of the drum 14. To further elaborate on this last exemplary advantage, it may be expected that—particularly where the drum 14 is not stopped during tripe change-out—every tripe change-out process may not be successfully completed before the nozzle 18 passes too far from the ideal loading area of the apparatus 10. For instance, an operator may prick a finger on the tip 109, causing a momentary lapse in concentration preventing him/her from returning the nozzle 18 to the "on" position before the nozzle 18 passes out of the ideal loading area. Regardless of the point in the attachment process at which such an error may occur, if the discharge opening 106 (and, by extension, the nozzle 18) is during all adjustments at least partly maintained within the outer margin 146, it is less likely to collide with surrounding structure and/or to be inadvertently separated from the tripe.

Upon successful attachment of the tripe to the drum 14 and rotation of the nozzle 18 to the "on" position, the drum 14 is either then rotated or has been rotating as the tripe is attached thereto. The tripe is wrapped around the drum 14 as shown in FIG. 2. The flighting 48 facilitates arrangement of the tripes along the surface 36 in a single layer helical configuration. As the drum 14 rotates in a first half-revolution, the nozzle 18 discharges fluid into the tripes. The rotation of the drum 14, in combination with gravity, allows for a relatively low volume of low pressure fluid to provide a highly effective cleaning of the tripes while leaving the micros membrane in tact and inside the tripes.

A relatively low fluid flow is preferably discharged from the nozzle and falls by gravity into the lower portion of the tripe (i.e., to the portion of the tripe near the bottom of drum 14). The small volume of fluid remains at the bottom of the drum 14 as a result of gravity and, because the tripe is wrapped around the drum 14, the fluid naturally flows through the tripe toward the unconnected, free distal end of the tripe. It is believed that each time the nozzle 18 passes over top dead center (i.e., the twelve o'clock position when viewing FIG. 2 and/or FIG. 13) a quantity of fluid is caught within the first round (the first convolution of the tripe around the drum 14) of the tripe and this quantity of fluid flushes through the remaining rounds of the tripe as the drum 14 rotates.

Moreover, as the nozzle 18 passes over top dead center, the valve 25 preferably substantially restricts or prevents cleaning fluid flow to the nozzle 18 during the subsequent half-revolution of the drum 14. This reduces waste and undesirable loss of cleaning fluid to surrounding surfaces during segments of rotation in which cleaning fluid is inherently less effective for cleaning. This also permits use, if desired, of a higher pressure/flow rate cleaning fluid flow during the other segments of rotation—i.e., when the nozzle 18 expels cleaning fluid in a direction having a generally downward component—because there is less need to moderate flow to reduce the losses noted above.

Throughout multiple revolutions of the drum 14, quantities of cleaning fluid remain at the bottom of the drum 14 as the fluid moves toward the distal end of the tripe. The fluid is preferably of sufficient volume to entirely immerse the inner circumference of the tripe along at least a noticeable segment of each round, without filling each round. The fluid and debris preferably exits the distal end of the tripe as the drum 14 rotates.

When it is desired to unwrap the tripe from the drum 14, the nozzle 18 may be turned to the bent configuration corresponding to an "off" position. The fixed end of the tripe may be removed from the barb 108 and the nozzle 18 and directed into the unloading trough 42 so that the tripe unwraps into the unloading trough 42 as the drum 14 is rotated. In due course, a new tripe may be attached to the nozzle 18 as the drum 14 continues to rotate to begin a new cleaning cycle.

The preferred form of the invention described above is to be used as illustration only, and should not be utilized in a limiting sense in interpreting the scope of the present invention. Obvious modifications to the exemplary embodiment, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A tripes cleaning apparatus comprising:
a rotatable drum presenting a tripes-supporting surface; and
an integrated fluid valve and nozzle assembly operable to selectively discharge fluid from a source into the tripes as the drum is rotated,
said assembly including a valve base fixed relative to the tripes-supporting surface,
said assembly including a valve body rotatable relative to the valve base into and out of a closed position, with fluid flow to the tripes being at least substantially prevented when the valve body is in the closed position,
said assembly including a nozzle rigidly fixed to the valve body,
said nozzle being elongated to present a fluid discharge opening spaced from the valve body, with swinging of the nozzle controlling rotation of the valve body into and out of the closed position.

2. The tripes cleaning apparatus as claimed in claim 1,
said drum being configured to rotate about a drum axis,
said valve body being configured to rotate about a body axis that is substantially transverse to the drum axis.

3. The tripes cleaning apparatus as claimed in claim 1,
said drum including a substantially cylindrical body that presents the tripes-supporting surface,
said drum including a set of flighting extending radially relative to the tripes-supporting surface, with the fighting being operable to helically arrange the tripes along the tripes-supporting surface.

4. The tripes cleaning apparatus as claimed in claim 3,
said drum presenting an outermost drum margin,
said fluid discharge opening being positioned radially inside the outermost drum margin when the nozzle swings into and out of the closed position.

5. The tripes cleaning apparatus as claimed in claim 4,
said fighting projecting radially outward from the tripes-supporting surface,
said outermost drum margin being defined by the flighting.

6. The tripes cleaning apparatus as claimed in claim 1,
said fluid discharge opening being spaced from the valve base a distance of at least about 2 inches.

7. The tripes cleaning apparatus as claimed in claim 6,
said distance being at least about 4 inches.

8. The tripes cleaning apparatus as claimed in claim 6,
said nozzle including a tubular rigid body presenting opposite proximal and distal ends, with the proximal end being coupled to the valve base,
said distal end defining the fluid discharge opening.

9. The tripes cleaning apparatus as claimed in claim 1,
said nozzle being substantially restricted to swing in a single plane.

10. The tripes cleaning apparatus as claimed in claim 9,
said drum being configured to rotate about a drum axis,
said drum axis being substantially parallel to the single plane.

11. The tripes cleaning apparatus as claimed in claim 9,
said valve base and said valve body presenting substantially planar, slidably interengaging faces,
said faces being substantially coincident or parallel to the single plane.

12. The tripes cleaning apparatus as claimed in claim 11,
said faces respectively incorporating a pin and groove connection configured to restrict the range of rotation of the valve body relative to the valve base.

13. The tripes cleaning apparatus as claimed in claim 12,
said range of rotation being less than about thirty degrees (30°).

14. The tripes cleaning apparatus as claimed in claim 9,
said valve base defining an inlet fluid passage,
said valve body defining an outlet fluid passage,
said passages being misaligned when the valve body is in the closed position and at least partially aligned when the valve body is out of the closed position.

15. The tripes cleaning apparatus as claimed in claim 14,
said valve base and said valve body presenting substantially planar, slidably interengaging faces,
each of said passages intersecting an associated one of the faces,
said assembly including a spring-biased gasket coupled relative to one of the passages and yieldably urged against the face associated with the other of the passages.

16. The tripes cleaning apparatus as claimed in claim 1,
said valve base defining an inlet fluid passage,
said valve body defining an outlet fluid passage,
said passages being misaligned when the valve body is in the closed position and at least partially aligned when the valve body is out of the closed position.

17. The tripes cleaning apparatus as claimed in claim 16,
said assembly including a spring-biased gasket coupled to one of the valve base and valve body,
said gasket being yieldably urged against the other of the valve base and valve body.

18. The tripes cleaning apparatus as claimed in claim 1,
said nozzle including a tubular rigid nozzle body that has an outer surface,
said nozzle including a barb fixed to the outer surface.

19. The tripes cleaning apparatus as claimed in claim 18,
said nozzle body presenting opposite proximal and distal ends, with the proximal end being coupled to the valve base,
said distal end defining the fluid discharge opening,
said barb extending from the outer surface of the nozzle body adjacent the distal end to a tip pointing generally toward the proximal end.

20. The tripes cleaning apparatus as claimed in claim 1, further comprising:
a frame supporting the drum for rotation about an axis;
loading and unloading troughs attached to the frame and operable to support the tripes; and
a spray bar attached to the frame and operable to spray fluid from the fluid source onto the outside of the tripes,
each of said loading and unloading troughs, and the spray bar, having an operable portion extending along a length of the drum,
said nozzle being configured to remain entirely radially inside of the operable portions of the loading and unloading troughs and the spray bar throughout an entire revolution of the drum.

* * * * *